United States Patent
Davenport et al.

(10) Patent No.: US 7,236,462 B2
(45) Date of Patent: Jun. 26, 2007

(54) METHOD FOR DATA EXCHANGE WITH A MOBILE ASSET CONSIDERING COMMUNICATION LINK QUALITY

(75) Inventors: David M. Davenport, Niskayuna, NY (US); Juan Laguer-Diaz, San Juan, PR (US); Robert A. Gray, Erie, PA (US)

(73) Assignee: General Electric Company, Schenectady, NY (US)

( * ) Notice: Subject to any disclaimer, the term of this patent is extended or adjusted under 35 U.S.C. 154(b) by 1074 days.

(21) Appl. No.: 10/303,435

(22) Filed: Nov. 25, 2002

(65) Prior Publication Data

US 2003/0091017 A1    May 15, 2003

Related U.S. Application Data

(63) Continuation-in-part of application No. 09/411,113, filed on Oct. 4, 1999, now Pat. No. 6,487,393.

(51) Int. Cl.
*H04L 1/00* (2006.01)
(52) U.S. Cl. .................................... 370/252; 370/346
(58) Field of Classification Search ............... 455/557; 370/252, 346, 471; 340/995.12; 701/208
See application file for complete search history.

(56) References Cited

U.S. PATENT DOCUMENTS

| | | | |
|---|---|---|---|
| 3,601,602 A | | 8/1971 | Smith |
| 3,944,986 A | | 3/1976 | Staples |
| 4,691,314 A | * | 9/1987 | Bergins et al. ............. 370/471 |
| 4,697,281 A | * | 9/1987 | O'Sullivan .................. 455/557 |
| 4,711,418 A | | 12/1987 | Aver, Jr. et al. |
| 5,415,369 A | | 5/1995 | Hungate |
| 5,511,749 A | | 4/1996 | Horst et al. |
| 5,543,789 A | * | 8/1996 | Behr et al. ............. 340/995.12 |
| 5,574,469 A | | 11/1996 | Hsu |
| 5,682,139 A | | 10/1997 | Pradeep et al. |
| 5,694,391 A | * | 12/1997 | Diachina et al. ............ 370/346 |

(Continued)

OTHER PUBLICATIONS

Castro, Jonathan P. Statistical Observations of Data Transmission Over Land Mobile Satellite Channels. IEEE Journal on Selected Areas in Communications, vol. 10, No. 8, Oct. 1992, pp. 1227-1235.

(Continued)

*Primary Examiner*—Chi Pham
*Assistant Examiner*—Albert T. Chou
(74) *Attorney, Agent, or Firm*—Carlos Luis Hanze; W. David Sartor; Beusse Wolter Sanks Mora & Maire, P.A.

(57) ABSTRACT

A method for data exchange with a mobile asset wherein the communication link quality at the location of the mobile asset is measured at the time of the data transfer. The packet size for the data transfer is selected in response to the communication link quality. The current communication link quality measurement may be used alone or in combination with historical communication link quality data for selecting the data packet size. Communication link quality may be determined repeatedly and the packet size reset accordingly in response to changes in the link quality. A difference between the current communication link quality and historical link quality data may trigger appropriate corrective action, such as identifying the source of intentional or unintentional jamming.

18 Claims, 2 Drawing Sheets

U.S. PATENT DOCUMENTS 5,785,283 A      7/1998   Ehrenberger et al.
5,826,198 A     10/1998   Bergins et al.
5,828,979 A     10/1998   Polivka et al.
6,516,267 B1 *   2/2003   Cherveny et al. ........... 701/208
RE39,427 E  *  12/2006   O'Sullivan .................. 455/557

OTHER PUBLICATIONS

Loo, Chun. Digital Transmission Through a Land Mobile Satellite Channel. IEEE Transactions on Communications, vol. 38, No. 5, May 1990, pp. 693-697.

* cited by examiner

METHOD FOR DATA EXCHANGE WITH A MOBILE ASSET CONSIDERING COMMUNICATION LINK QUALITY

This application is a continuation-in-part of U.S. patent application Ser. No. 09/411,113 filed Oct. 4, 1999 now U.S. Pat. No. 6,487,393.

BACKGROUND OF THE INVENTION

This invention relates generally to a method for exchanging data, and more specifically to a method for exchanging data between a mobile asset, such as a train, and a fixed data center utilizing a wireless communication link.

The transmission of data over a radio frequency channel is well known in the art. There are several wireless communications systems that are commercially available, including both cellular and satellite based systems. It is also known that the effectiveness of the transmission of data over such systems is dependent upon an appropriately high signal to noise ratio during the data transmission. While the transmission of voice information may be accomplished in the presence of noise in the communication link, the transmission of data will require a much cleaner signal in order to avoid the corruption of the data. Corrupted data may be retransmitted, thereby increasing the time and cost involved with the data transfer. When utilizing such systems on a mobile asset, such as a truck, an automobile or a train, it is difficult to assure that a sufficiently high signal to noise ratio will be maintained throughout the entire duration of the data transmittal because changes of asset position relative to terrain and man-made obstacles will affect the radio frequency propagation channel characteristics.

Improved communications systems have been developed to address the need for reliable data transmission over a wireless network. For example, U.S. Pat. No. 5,826,198 issued on Oct. 20, 1998, to Bergins, et al., teaches an improved cellular telephone network containing a means for measuring the quality of the communications channel for insuring that data transmission is attempted only when the channel signal level is greater than a pre-defined value. Such systems increase the cost of the communication link, and they may function to inhibit communications without regard for other variables affecting the need for the data transmittal.

BRIEF SUMMARY OF THE INVENTION

Thus, there is a particular need for a method of transferring data from and to a mobile platform that will assure the efficient transmission of data.

A method of data exchange with a mobile asset is described herein as including: determining communication link quality at a location of a mobile asset; and selecting a packet size for data transfer with the mobile asset in response to the communication link quality. The communication link quality may be determined repeatedly at respective locations of the mobile asset at it moves along a route; and the packet size may be reset in response to a determined change in the communication link quality from a first location to a second location along the route. The method may further include: determining a location of the mobile asset; predicting communication link quality at the location based upon an existing communication link quality map; and selecting the packet size for the data transfer in response to the predicted communication link quality and the determined communication link quality.

The method may further include: determining communication link quality associated with a plurality of geographic segments; utilizing the selected packet size for the transfer of a first portion of data; and resetting the packet size for the transfer of a second portion of the data in response to a predicted change in communication link quality resulting from the mobile asset moving from a first geographic segment to a second geographic segment during the data transfer.

The method may further include: predicting communication link quality for the location of the mobile asset based upon an established communication link quality map; and biasing the packet size selection in response to a comparison of the determined communication link quality and the predicted communication link quality for the location of the mobile asset.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

The limitations of the prior art are exacerbated when using a wireless communications system for transferring data between a fleet of mobile assets, such as trucks or locomotives, and a centralized data center. The management of such assets depends upon the regular downloading of data from the mobile asset to the data center. If such data transmittals are interrupted or corrupted, the value of the centralized data center is reduced, and/or the cost of the transmission of the data is increased. Moreover, as the size of the fleet of mobile assets grows, it becomes increasingly important to schedule the downloading of data from the various mobile assets in order to avoid an overload of the communication link. For example, if each mobile asset were programmed to download data at noon each day, the channels of communication into the data center would become quickly overloaded. Alternatively, various mobile assets may be programmed to download data at specified times in order to stagger the download schedule throughout the day. However, such a system may fail because a given asset may be in a region of poor communication quality at its scheduled communication time, thereby resulting in the loss of data for that day. Similar problems may result if the operator of each mobile asset were given discretion with regard to when the data transfer would occur.

The inventors have recognized that, for satellite and cellular based communications links, many of the factors that affect the quality of the communication link will remain essentially constant over time for a particular location within the territory of the communications system. For example, on a railroad system there are known and fixed obstructions that adversely affect the quality of a communications link. Such obstructions may include tunnels, hills, buildings, trees, etc.

Because such obstructions remain essentially constant, the inventors have found it advantageous to generate a map of the quality of the communication link that may be used to facilitate efficient communication with trains traveling over the railroad system.

Figure 1:
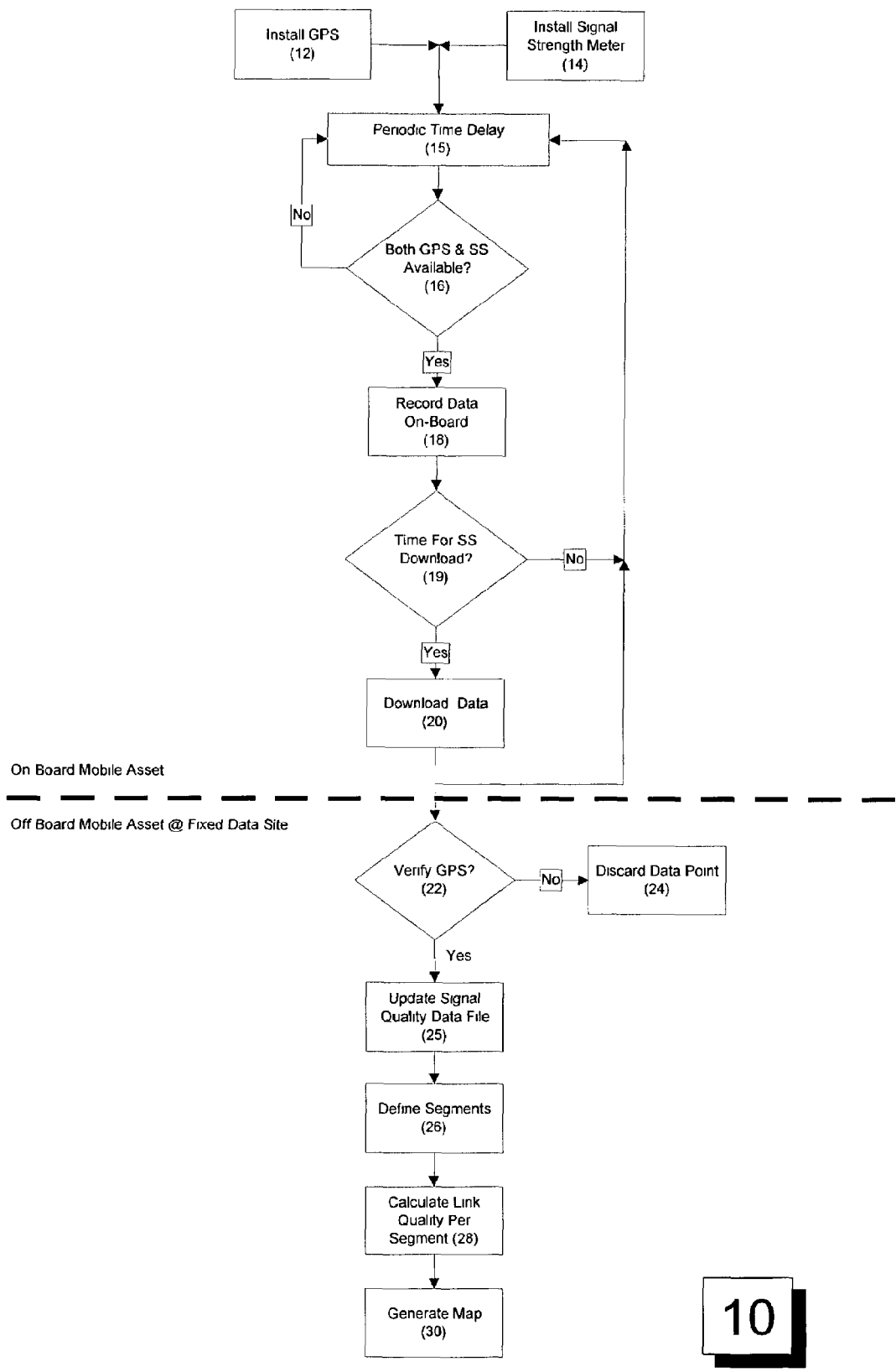
FIG. 1 is a process block diagram of a method of generating a map of the signal quality of a communications link.

FIG. 1 illustrates a method 10 for mapping the quality of a communication link over the route of a mobile asset. The communication link may be a cellular phone system, satellite based communications system, or other wireless communication system. To create such a map, a global positioning indication system (GPS) is installed 12 on one or more mobile assets. In addition, a means for measuring a communication link quality is also installed 14 on each such mobile asset. Such a means for measuring a communication link quality may be as simple as a signal strength meter of a cellular telephone, or it may be a more sophisticated instrument measuring specific parameters of the line-of-sight signal and shadow signals. The measure of link quality may depend upon the type of communication system being used. The mobile asset(s) is/are then propelled along the route, such as moving a train along the rail lines of a railway system. Following a periodic time delay 15, measurements of communication link quality and the position of the mobile asset are then gathered 16 at a plurality of locations along the route. The time delay may be predetermined, for example at least once every ten minutes, or may be a function of the speed of travel of the asset, or may be another calculated interval. Such data may be recorded only when both the signal quality and position signals are available 16, since it is the correlation of signal quality to location along the route that provides the useful information. Such data is recorded 18 on-board the mobile asset, such as by storing the data on the hard drive of a computer on-board a train locomotive. The data may then be downloaded 20 at periodic intervals to an off-board database. A plurality of types of communication link quality data may be collected along the route, either concurrently or at different time periods, and like types of the communication link quality data may be grouped to define a plurality of communication link quality databases. More than one mobile asset may be used to collect the data in order to reduce the time needed for the data collection, or to obtain data for conditions that may vary from one mobile asset to another. The validity of the GPS readings may be verified off-board, and the GPS validity information may be recorded along with the GPS location entry. If it is determined that one or more of the GPS location entries is invalid 22, the communications link quality data associated with such GPS location entry may be discarded from the data base 24. Location data is not necessarily limited to data from a GPS system, as other techniques and systems may be used to obtain data representative of the location of the mobile asset at the time the link quality data is collected. Data verified to be accurate, including updated data or data from additional geographic areas obtained at later times, is then used to update a signal quality data file, as shown as step 25 of FIG. 1. FIG. 1 indicates which functions/systems are located on-board the mobile asset and which are located off-board the mobile asset for one embodiment of the present invention. One may appreciate that other embodiments may have certain of these functions/systems in other physical locations.

The signal quality data file may be analyzed and the results displayed for use in any variety of ways. For example, it may be useful to manipulate the signal quality data to define 26 a plurality of segments that represent geographic areas having communication link quality data within a predetermined range within each segment. One may imagine that the signal quality from a satellite communications link would fluctuate very little as a train passes across the Great Plains portion of the United States due to the relatively flat terrain and lack of tunnels and other obstructions. In such geographic areas, a single segment may be defined as being dozens of miles long. For each segment, a representative value for the communication link quality may be calculated 28. Such a representative value may be any one of many known statistical measures, such as mean, average, mu, sigma, etc. A map of the communication link quality may then be generated 30 utilizing either the raw signal quality data or the representative signal quality data for each segment. If the communication link quality differs significantly between assets or for other reasons, such as for example at different times of the day, the map may reflect such variables or a common map may be prepared to encompass all such variables. A plurality of maps or map segments may be prepared for a single geographical area to reflect the communications link quality for different types of communication, e.g. cellular verses satellite, for different frequencies, for CDMA verses TDMA, for different carriers, for times of the day or seasons of the year, etc.

Figure 2:
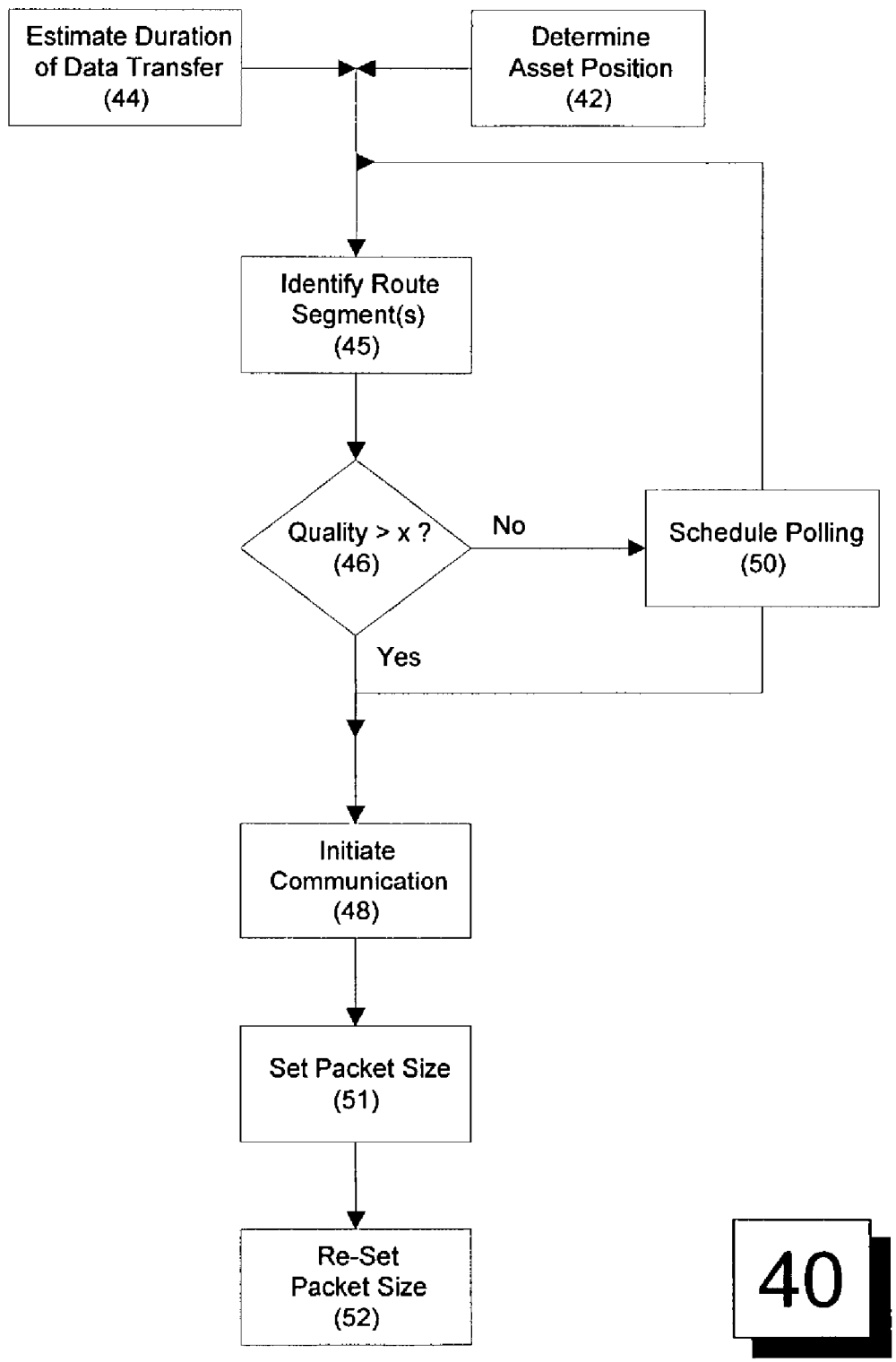
FIG. 2 is a process block diagram of a method for transmitting data through a communication link with consideration given to the quality of the communication link for determining when the communication is initiated and for determining the size of the data packets to be transmitted.

Once a communication link quality map is available for a particular route used by a fleet of mobile assets, such information may be utilized to improve the effectiveness of the transmission of data between mobile assets and a centralized data center. FIG. 2 illustrates such an improved method 40 for transferring data. The location of a mobile asset may be determined 42, either by automatic means, such as a GPS transponder or other sensors located along the route of the mobile asset, or by operator action. It is also possible to estimate 44 the expected duration of a data transfer. Such an estimate may be based on the amount of data to be transmitted and an expected data transfer rate, or the estimate may be an arbitrarily assigned conservative value. By knowing the position of the asset and its direction of travel, it is possible to identify (45) the segment or segments of the communication link quality map from FIG. 1 in which the asset will be located during the planned data transfer. For example, if the time required to download data is anticipated to be five minutes, only a single segment may be involved in areas where the size of the segments is very large. Alternatively, if the mobile asset is nearing a border of a segment or is located in a geographic area of small segments, it is possible that the mobile asset may pass through several different segments of the communication link quality map during the data transfer interval. The quality of the communication link in the segment or segments through which the asset will pass during the data transfer may be compared to a pre-determined value, as illustrated in step 46 of FIG. 2. If more than one communications link quality map/database is available, the communications link quality information is obtained from the map/database that corresponds to the planned data transfer type, i.e. cellular verses satellite, CDMA verses TDMA, etc. If the communication link quality exceeds the predetermined value, communication between the mobile asset and the centralized database may be initiated 48. If the communication link quality is below the predetermined value, the data transfer is not initiated.

It is possible to schedule the polling of a mobile asset for a time period in the future when the mobile asset is expected to be located in a segment having a sufficiently high communication quality. Such scheduling 50 may include consideration of the expected itinerary of the asset, the cost for communication time at various times of the day, arbitrary deadlines for the transfer of data, and the number and location of other mobile assets communicating through the same communication link. For example, in one embodiment, a fleet of locomotives travelling over a railway system may be required to transmit data to a centralized data center at least daily in order to plan the maintenance schedule for the locomotives, and in order to generate statistics indicative of the efficiency of operation of the fleet. A wireless communication link such as the mobile satellite services provided by American Mobile Satellite Corporation or TMI Communications and terminal hardware such as that of Westinghouse Wireless Solutions may be installed on each locomotive in the fleet. The railway system includes a fixed track route for which a map of the quality of the communication link has been prepared in accordance with the method illustrated in FIG. 1. A program may be prepared to schedule 50 the polling of the various locomotives so that each locomotive is polled at least once daily, and no more than one locomotive is polled at a given time. The program contains the communication link quality information, the planned itinerary of each locomotive, and the position of each locomotive at a given time. Each locomotive is then individually contacted from the central data center at a time when the train is in a section of the railway where the quality of the communication link is adequate to assure high quality data transfer during the duration of the data transfer. The position of the locomotives may be updated periodically to allow the program to recalculate the polling schedule in the event of delays or other changes in the expected itineraries. A decisional rule base may be incorporated into the program to optimize the quality of the data transfer and/or to reduce the total cost of the use of the data link.

Once communication has been initiated 48 between the mobile asset and a fixed location via a communication link, the size of the data packets used to download the data may be selected, as is known in the art of digital communications. The term "data packet" as used herein is meant to include both the user application data being transmitted and the associated protocol framing bits that together form a protocol data unit. Internet transmissions, for example, utilize the TCP/IP protocol family. A primary concern when controlling packet size is data transfer (throughput) efficiency given the variable communication quality of the mobile environment. The efficiency of any given data exchange directly impacts the financial cost and duration of the activity. Dividing application data into small packets may facilitate transmissions through spatial regions/temporal periods of poor signal coverage where larger packets would encounter errors, become corrupted and require retransmission. With each individual packet (regardless of size) protocol framing bits are added to user data, and this decreases the data transfer efficiency. Thus, sending fewer, larger packets reduces the quantity of added framing bits and improves transfer efficiency. The trade-off is sending the largest packet size that can be supported by the mobile communication link and its inherent shadow and fading phenomena.

The quality of the communication link in the segment or segments of the asset during the data transfer may be considered to determine the optimal packet size. The optimal packet size is the size that maximizes the data transfer throughput by increasing the ratio of data-to-overhead bits while reducing the number of error-corrupted packets requiring retransmission. As the quality of the communication link is improved, the optimal data packet size will increase, since there is a lower probability of data corruption and, therefore, the need to retransmit a packet. The packet size may be set 51 at the initiation of a communication interval, however, it may also be reset 52 following the completion of a portion of the information transfer, such as after an individual file or predetermined quantity of data bytes. This may be particularly useful for data transmissions requiring a long duration in a geographic area containing rapidly changing communication link quality levels.

Thus, prior knowledge of a mobile asset's position and velocity may be used in conjunction with a communications link quality database to dynamically schedule future data retrieval sessions and to calculate a transfer function having an optimal packet size efficiency. Such a method is operable with a variety of communications technologies, and is particularly adapted for use with wireless communications systems. By considering the communication link quality as a function of the current and future location of a mobile asset, the efficiency of data transfer may be improved considerably when compared to prior art methods.

The packet size for data transfer with the mobile asset may be selected in response to the communication link quality at the location of the mobile asset by predicting the link quality in advance or by measuring the link quality at the time of the data transfer transmission. The link quality may be predicted using a map of route segment link quality as described above with regard to FIG. 1. The link quality may be measured at the time of the data transfer by a sensor positioned on the mobile asset or in the local area or through other known devices and techniques. Communications link quality may be determined by a measurement of signal strength, signal to noise ratio, line-of-sight verses shadow signal, or other useful characteristic indicative of the ability of the link to convey the data with an acceptable level of corruption at a desired data transfer rate. The packet size selected for the data transfer may then be selected in response to the communication link quality at the location of the mobile asset. The communication link quality may be rechecked periodically following the completion of a portion of the data transfer, and if a meaningful change is detected, the packet size may be reset accordingly. Such a change may be the result of the mobile asset moving to a new location during the first portion of the data transfer.

Local measurement of communication link quality at the time of a data transfer may be used with an established communication link quality map to determine data transfer packet size. If the local measurement confirms the link quality predicted by the previously determined route segment map, the data transfer packet size may be selected in response to the values predicted by the map. If, however, communications link quality is statistically different than the predicted values, the packet size may be adjusted accordingly. Such adjustment may allow biasing the packet size in one direction only. For example, if data integrity is the more important criteria, then data packet size may be made smaller if link quality is below the predicted value, but packet size may not be made larger if link quality is better than the predicted value. If rapid data transfer is the more important criteria, then data packet size may not be made smaller if link quality is below the predicted value, but packet size may be made larger if link quality is better than the predicted value.

Data transfer packet size may further be made responsive to a real-time and predetermined communications link measurements by selecting a data transfer packet size based upon the communications link quality measured at the present location of the mobile asset, then adjusting the data transfer packet size accordingly if the previously prepared route segment communications link quality map indicates that the mobile asset will enter a segment with a different predicted quality level during the duration of the data transfer. In this manner, the quality map may be used as a guide for determining the expected relative link quality between two route segments while the actual measurements at the time of the transmittal is used in determining the absolute communications link quality level. This approach may be useful when the link quality is expected to change regularly along an entire route, such as differences in link quality that may be routinely expected from day to night, from season to season, or during periods of differing sun spot activity.

If a plurality of link quality maps is available for a plurality of types of data transfers, i.e. cellular verses satellite, CDMA verses TDMA, etc, the type of data transfer may be selected in response to the communication link quality data in the plurality of databases for a location of the data transfer. Thus, one type of data transfer may be selected over another type if the communication link quality for the planned data transfer location is superior for the selected type of data transfer.

Local real-time communications link quality measurements may be used to expand and/or to update an existing link quality route database. If a mobile asset enters a geographic area that was not previously mapped, the measured link quality data may be captured and added to the existing database. If the difference between the current data and the historical data exceeds a predetermined value, the current information may be incorporated into the historical map as an exception indicator. The trigger value for such action may be an absolute value, a percentage value, or other measure of the statistical significance of the change. The existing map may be updated immediately, or updates may be delayed until further measurements confirm the change in link quality.

A statistically significant difference between a real-time link quality measurement and an established historical link quality value may be used to trigger an investigation into the cause for the difference. Increased noise or adjacent channel levels, etc. may be indicative of an intentional or unintentional jamming of the communication link. Service personnel may be dispatched to the site to diagnose the situation, to identify the source of jamming, and/or to take appropriate corrective action. The identification of transient jamming sources may be especially important for radio-based train control systems, particularly in light of current homeland security efforts.

The schedule 50 for polling of a plurality of mobile assets described above may also be determined in response to both an established communications link quality map and real-time link quality measurements. If local measurements indicate a change in the communications link quality across a route, the polling schedule may be adjusted accordingly.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method of data exchange between a data center and a mobile asset, the method comprising:
    determining a location of a mobile asset;
    determining a communication link quality at the determined location of the mobile asset;
    predicting a communication link quality at the location based upon an existing communication link quality database relating location to communication link quality; and
    selecting a packet size for data transfer with the mobile asset in response to the predicted communication link quality and the determined communication link quality.

2. The method of claim 1, further comprising resetting the packet size for the data transfer following completion of a portion of the data transfer.

3. The method of claim 1, further comprising:
    repeatedly determining communication link quality at respective locations of the mobile asset at it moves along a route; and
    resetting the packet size for the data transfer in response to a determined change in the communication link quality from a first location to a second location along the route.

4. The method of claim 1, further comprising:
    predicting communication link quality associated with a plurality of geographic segments; and
    selecting the packet size for the data transfer in response to the determined communication link quality at the location of the mobile asset, the predicted communication link quality responsive to a geographic segment in which the mobile asset is located, and a predicted communication link quality for a geographic segment into which the mobile asset will move during the data transfer.

5. The method of claim 1, further comprising:
    determining communication link quality associated with a plurality of geographic segments;
    utilizing the selected packet size for the transfer of a first portion of data; and
    resetting the packet size for the transfer of a second portion of the data in response to a predicted change In communication link quality resulting from the mobile asset moving from a first geographic segment to a second geographic segment during the data transfer.

6. The method of claim 1, further comprising scheduling the polling of a plurality of mobile assets in response to the determined communication link quality.

7. The method of claim 1, further comprising:
    biasing the packet size selection in response to a comparison of the determined communication link quality and the predicted communication link quality for the location of the mobile asset.

8. The method of claim 1, further comprising revising a database containing historical communications link quality data in response to the determined communication link quality.

9. A method of data exchange between a data center and a mobile asset, the method comprising:
    establishing a database correlating historical communication link quality data and location data;
    determining current communication link quality data for a location;
    comparing the current communication link quality data with the historical communication link data in the database for the location to determine a difference; and
    selecting a communication link operating parameter responsive to the difference for use in controlling a communication link quality between the data center and the mobile asset.

10. The method of claim 9, further comprising updating the database if the difference exceeds a predetermined value.

11. The method of claim 9, further comprising performing a site investigation if the difference exceeds a predetermined value.

12. The method of claim 9, further comprising adding the current communication link quality data to the database if no historical communication link quality data is correlated in the database with the location.

13. A method of data exchange between a data center and a mobile asset, the method comprising:
obtaining communication link quality data and corresponding location data at a plurality of locations of a mobile asset as the mobile asset traverses a route;
collecting the communication link quality data and corresponding location data to define a communication link quality database; and
selecting a communication link operating parameter for a data transfer event in response to communication link quality data in the database for a location of the data transfer.

14. The method of claim 13, further comprising:
obtaining a plurality of types of communication link quality data for a plurality of locations along the route; and
grouping like types of the communication link quality data and corresponding location data to define a plurality of communication link quality databases.

15. The method of claim 13, further comprising:
dividing the route into segments having communication link quality data that is within a predetermined range within each segment;
identifying a representative value for the communication link quality range within each segment; and
creating a map correlating each segment with its respective representative value.

16. The method of claim 13 further comprising:
determining current communication link quality data at a location along the route at a time of a data transfer event; and
using the current communication link quality data to update the database.

17. The method of claim 13, wherein selecting the communication link operating parameter comprises selecting a packet size for a data transfer event in response to communication link quality data in the database for a location of the data transfer.

18. The method of claim 14, further comprising selecting a type of data transfer in response to communication link quality data in the plurality the databases for a location of the data transfer.

* * * * *